United States Patent
Wallace et al.

(10) Patent No.: US 11,416,270 B2
(45) Date of Patent: Aug. 16, 2022

(54) SYSTEMS AND METHODS FOR DYNAMIC SERVER CONTROL BASED ON ESTIMATED SCRIPT COMPLEXITY

(71) Applicant: TD Ameritrade IP Company, Inc., Omaha, NE (US)

(72) Inventors: Aaron David Wallace, Canton, MI (US); Abhilash Krishnankutty Nair, Ann Arbor, MI (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 157 days.

(21) Appl. No.: 16/816,196

(22) Filed: Mar. 11, 2020

(65) Prior Publication Data

US 2021/0286636 A1 Sep. 16, 2021

(51) Int. Cl.
| | |
|---|---|
| *G06F 9/44* | (2018.01) |
| *G06F 9/455* | (2018.01) |
| *G06F 9/30* | (2018.01) |
| *G06F 16/9035* | (2019.01) |
| *G06N 20/00* | (2019.01) |
| *G06F 16/9038* | (2019.01) |
| *G06F 9/38* | (2018.01) |

(52) U.S. Cl.
CPC ...... *G06F 9/45512* (2013.01); *G06F 9/30192* (2013.01); *G06F 9/3836* (2013.01); *G06F 16/9035* (2019.01); *G06F 16/9038* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2003/0009754 A1 | 1/2003 | Rowley et al. | |
| 2009/0024572 A1* | 1/2009 | Mehta | G06F 16/24542 |
| 2009/0089749 A1 | 4/2009 | Day et al. | |
| 2013/0232497 A1 | 9/2013 | Jalagam et al. | |
| 2014/0258910 A1* | 9/2014 | Liang | G06F 11/323 |
| | | | 715/772 |

(Continued)

OTHER PUBLICATIONS

International Search Report and Written Opinion for PCT Application No. PCT/IB2020/058499; dated Dec. 1, 2020; 10 pages.

(Continued)

*Primary Examiner* — Insun Kang

(57) ABSTRACT

A computer system includes processor hardware and memory hardware storing instructions for execution by the processor hardware. The instructions include, in response to receiving a first script from a user device, compiling the first script, generating an image representation of the compiled first script, and determining an estimated runtime of the first script using a machine learning algorithm. The instructions include transmitting the estimated runtime for display on a display of the user device, categorizing the estimated runtime, and transmitting the first script to a queue based on the categorization. The instructions include, in response to the first script reaching a front of the queue, executing the first script on a server of the plurality of servers that corresponds to the queue. The instructions include, in response to the first script being executed, transforming the display of the user device according to instructions of the first script.

18 Claims, 7 Drawing Sheets

(56) References Cited

U.S. PATENT DOCUMENTS

| | | |
|---|---|---|
| 2016/0112341 A1 | 4/2016 | Lui et al. |
| 2016/0112531 A1 | 4/2016 | Milton et al. |
| 2016/0188696 A1* | 6/2016 | Belghiti ............ G06F 16/2272 707/718 |
| 2017/0228650 A1* | 8/2017 | Fu ........................ G06N 5/04 |
| 2018/0321980 A1* | 11/2018 | Lo ........................ G06N 7/005 |
| 2018/0329742 A1* | 11/2018 | Lo ........................ G06F 9/4887 |
| 2020/0104230 A1* | 4/2020 | Hasija .................. G06F 9/4881 |
| 2020/0125963 A1* | 4/2020 | von Trapp ............ G06F 9/4881 |
| 2020/0218634 A1* | 7/2020 | Jones ................... G06F 11/3604 |
| 2020/0285642 A1* | 9/2020 | Bei ...................... G06F 11/3409 |
| 2021/0201128 A1* | 7/2021 | Xu ........................ G06N 3/08 |

OTHER PUBLICATIONS

Quan Le et al.; Deep Learning at the Shallow End: Malware Classification for Non-Domain Experts; DFRWS 2018; 9 pages.

* cited by examiner

SYSTEMS AND METHODS FOR DYNAMIC SERVER CONTROL BASED ON ESTIMATED SCRIPT COMPLEXITY

FIELD

The present disclosure relates to distributed control of hardware and more particularly to executing software according to estimates of software runtime.

BACKGROUND

An entity can enhance user experience and interaction with the entity by employing software development platforms that offer users the ability to access data collected and stored by an entity and develop their own custom visualizations and data fields. As more and more software code or scripts are written, the demand on the entity's servers increases, which can lead to performance issues for the entity and for users. Users that write their own scripts and otherwise engage in customizations are generally understood to be some of the most active and engaged users. Therefore, it is imperative that results are delivered as quickly and consistently as possible to these users.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer system for coordinated control of a plurality of servers includes processor hardware and memory hardware coupled to the processor hardware. The memory hardware stores a script runtime database including a set of image representations and corresponding script runtimes and instructions for execution by the processor hardware. The instructions include, in response to receiving a first script from a user device, compiling the first script and generating an image representation of the compiled first script. The instructions include determining an estimated runtime of the first script using a machine learning algorithm. The machine learning algorithm is trained using the set of image representations and corresponding script runtimes of the script runtime database. The instructions include transmitting the estimated runtime for display on a display of the user device, categorizing the estimated runtime, and transmitting the first script to a queue based on the categorization. The instructions include, in response to the first script reaching a front of the queue, executing the first script on a server of the plurality of servers that corresponds to the queue. The instructions include, in response to the first script being executed, transforming the display of the user device according to instructions of the first script.

In other features, compiling the first script includes generating a bytecode representation of the first script. In other features, the image representation includes an array of pixels and an intensity of each pixel indicates a value of the bytecode representation. In other features, the instructions include, in response to receiving an indication the estimated runtime is accurate, storing the estimated runtime and the image representation in the script runtime database. In other features, the first script is received from the user device in response to selection of a user interface element. In other features, the first script is received from the user device in response to selection of a new line of the first script. In other features, the memory stores an information database including data referenced in the first script, and the first script includes an instruction to obtain data from the information database.

In other features, the instructions include, in response to receiving an indication the compiling of the first script failed, generating and transmitting a compile error to the user device. In other features, the instructions include categorizing the first script as a first type in response to the estimated runtime being less than a predetermined time and, in response to the first script being categorized as the first type, transmitting the first script to a first queue of a first server of the plurality of servers. In other features, the instructions include categorizing the first script as a second type in response to the estimated runtime being greater than a predetermined time and, in response to the first script being categorized as the second type, transmitting the first script to a second queue of a second server of the plurality of servers.

A processing system includes a plurality of servers and a computer system for coordinated control of the plurality of servers. The processing system includes processor hardware and memory hardware coupled to the processor hardware. The memory hardware stores a script runtime database including a set of image representations and corresponding script runtimes and instructions for execution by the processor hardware. The instructions include, in response to receiving a first script from a user device, compiling the first script and generating an image representation of the compiled first script. The instructions include determining an estimated runtime of the first script using a machine learning algorithm. The machine learning algorithm is trained using the set of image representations and corresponding script runtimes of the script runtime database. The instructions include transmitting the estimated runtime for display on a display of the user device, categorizing the estimated runtime, and transmitting the first script to a queue based on the categorization. The instructions include, in response to the first script reaching a front of the queue, executing the first script on a server of the plurality of servers that corresponds to the queue. The instructions include, in response to the first script being executed, transforming the display of the user device according to instructions of the first script.

A method for coordinated control of a plurality of servers includes, in response to receiving a first script from a user device, compiling the first script and generating an image representation of the compiled first script. The method includes determining an estimated runtime of the first script using a machine learning algorithm. The machine learning algorithm is trained using a set of image representations and corresponding script runtimes of a script runtime database, and the script runtime database includes the set of image representations and corresponding script runtimes. The method includes transmitting the estimated runtime for display on a display of the user device, categorizing the estimated runtime, and transmitting the first script to a queue based on the categorization. The method includes, in response to the first script reaching a front of the queue, executing the first script on a server of the plurality of servers that corresponds to the queue. The method includes, in response to the first script being executed, transforming the display of the user device according to instructions of the first script.

In other features, compiling the first script includes generating a bytecode representation of the first script. In other features, the image representation includes an array of pixels and an intensity of each pixel indicates a value of the bytecode representation. In other features, the method includes, in response to receiving an indication the estimated runtime is accurate, storing the estimated runtime and the image representation in the script runtime database. In other features, the first script is received from the user device in response to selection of: (i) a user interface element or (ii) a new line of the first script. In other features, the method includes storing an information database including data referenced in the first script. The first script includes an instruction to obtain data from the information database.

In other features, the method includes, in response to receiving an indication the compiling of the first script failed, generating and transmitting a compile error to the user device. In other features, the method includes categorizing the first script as a first type in response to the estimated runtime being less than a predetermined time and, in response to the first script being categorized as the first type, transmitting the first script to a first queue of a first server of the plurality of servers. In other features, the method includes categorizing the first script as a second type in response to the estimated runtime being greater than a predetermined time and, in response to the first script being categorized as the second type, transmitting the first script to a second queue of a second server of the plurality of servers.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
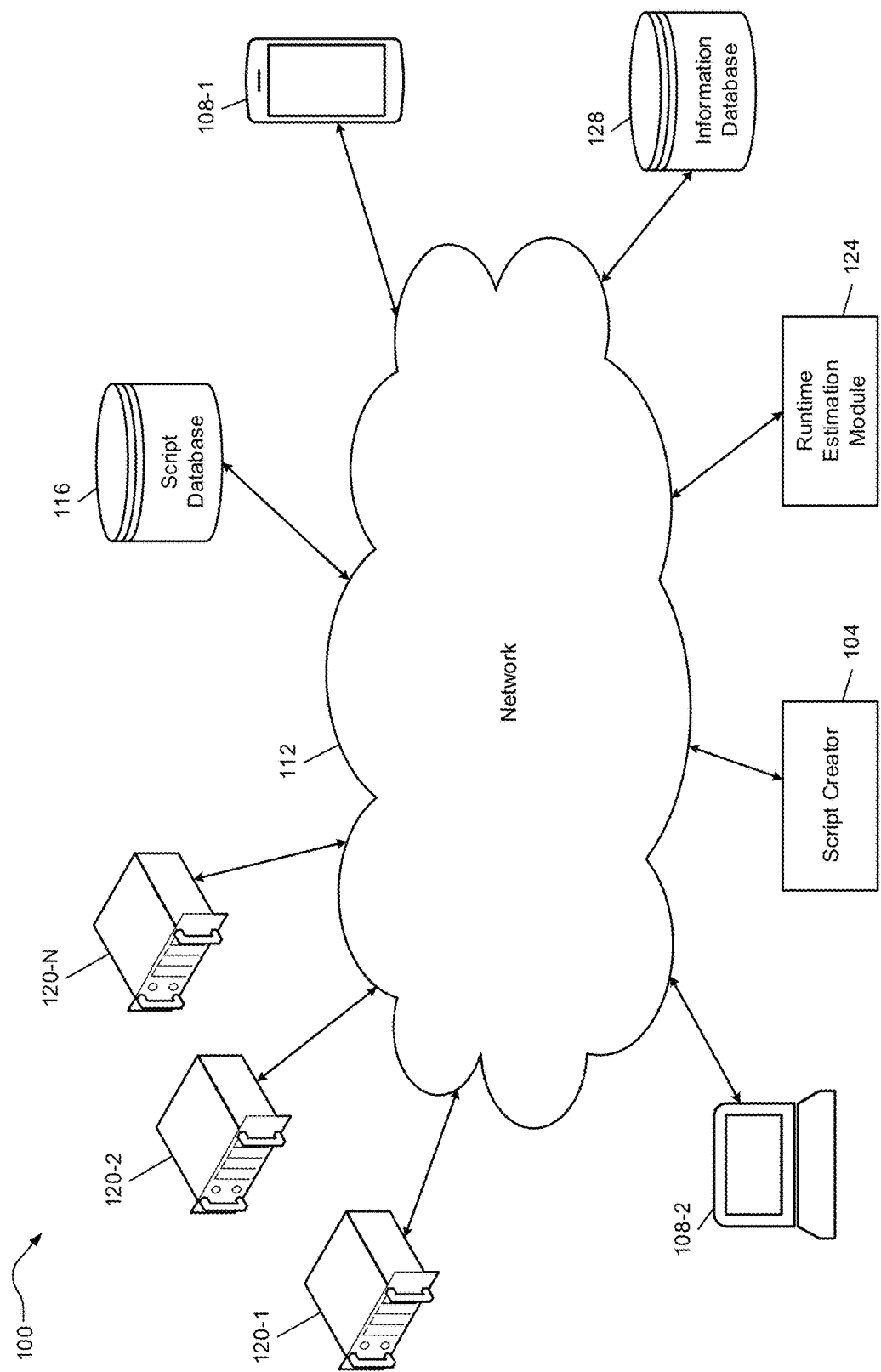
FIG. 1 is a high-level example block diagram of a runtime estimation system and a network communication system according to the principles of the present disclosure.

A runtime estimation system determines an estimated runtime of a script to (i) inform the drafter or user when to expect the complete execution of the script and (ii) efficiently organize server queues that execute scripts. In various implementations, the runtime estimation system can estimate the runtime of the script as the script is be drafted, for example, after each line of the script is completed. For platforms that allow users to draft personalized scripts that are executed by platform-operated servers, the complexity and runtime of the scripts can vary greatly. To improve user experience and reduce server load, the runtime estimation system determines an estimated runtime to display to the user and to direct the script to a server with an appropriate execution load to handle execution of the script.

For example, a script with a relatively fast runtime may be directed to a "fast lane" server to prevent scripts with longer runtimes from slowing down execution of quickly completed scripts. Similarly, scripts with longer runtimes may be directed to a "slow lane" server that handles a smaller number of scripts with a longer runtime, reducing server load. In various implementations, a script may be considered to have a fast runtime if the estimated runtime is less than 2 seconds while the script may be considered to have a long runtime if the estimated runtime is 2 seconds or greater.

In various implementations, the runtime estimation system can be configured to categorize the script as having a fast or slow runtime. In further implementations, the runtime estimation system can generate a numerical estimated runtime of the script. To perform the estimation, the runtime estimation system can implement machine learning to determine an estimated runtime using image representations of the script. Alternatively, the runtime estimation system can compare salient patterns of the script that have been identified using machine learning to estimate the runtime of the script.

When implementing the image representation method, the runtime estimation system uses a training dataset including many scripts (for example, 6,500,000 different scripts) with known runtimes. The runtime estimation system compiles each script to generate bytecode. The bytecode of each script is transformed into an image representation including a plurality of greyscale pixels where each pixel represents a value of the bytecode, the value being indicated based on a shade of the pixel having an intensity from 0 (black) to 254 (white). Then, the image representations along with the corresponding runtimes are used to train a machine learning algorithm to estimate runtimes of a new image representation.

In an implementation that uses salient patterns, the runtime estimation system performs machine learning analysis on the training dataset of scripts using natural language processing to identify salient patterns or functions within the scripts. In turn, because the training dataset of scripts includes a known runtime of each script, the machine learning algorithm can determine a runtime that corresponds to each identified salient pattern. The runtime estimation system can then identify salient patterns within a new script and estimate a runtime by obtaining and aggregating the corresponding runtimes of the identified salient patterns.

Referring to FIG. 1, a high-level example block diagram of a runtime estimation system 100 and a network communication system is shown. A script drafter or user can access a script drafting platform, such as script creator 104 using user devices 108-1 or 108-2. The user device 108-2 can access the script drafting platform via a Network 112, such as the Internet. The scripts can be stored locally on the user device 108-2 as well as stored remotely on a script database 116 operated by an entity associated with the script drafting platform. The runtime estimation system 100 also includes a set of servers 120-1, 120-2, ..., 120-N (collectively, servers 120) for executing the scripts. The set of servers 120 can each be assigned a type of script to execute based on a range of runtimes of the scripts.

The runtime estimation system 100 also includes a runtime estimation module 124 that is accessible over the Network 112. The runtime estimation module 124 obtains completed or in progress scripts from the script creator 104 and generates an estimated runtime. As mentioned above, in various implementations, the runtime estimation module 124 may instead categorize scripts into, for example, a short runtime category or a long runtime category. The runtime estimation module 124 is configured to display an indication of the category of the script or the estimated runtime (or both) on a display of the corresponding user device 108-2. Additionally, the runtime estimation module 124 includes a routing capability that routes or transmits the script to a server corresponding to the determined category or based on the estimated runtime.

For example, if the runtime estimation module 124 determines that the runtime of a particular script is one second, then the runtime estimation module 124 may route the script to a first server 120-1 that is designated to execute scripts with a runtime of less than 2 seconds. In various implementations, an information database 128 may be created by the entity to store data (real time data or otherwise), for users to access and manipulate using the script creator 104.

Figure 2A:
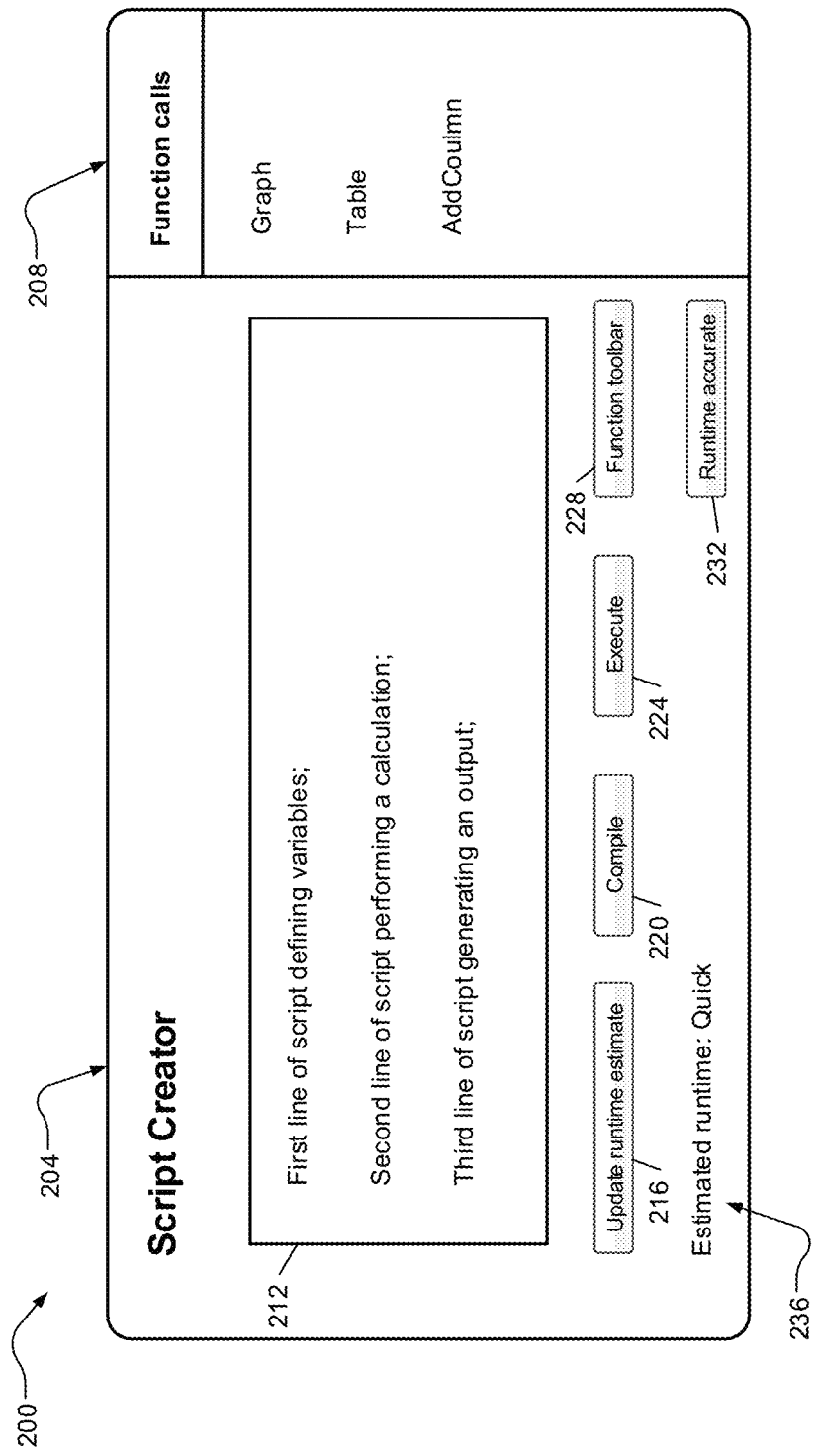
FIG. 2A is a representation of an example user interface presenting an example script creator screen according to the principles of the present disclosure.

Referring to FIG. 2A, a representation of an example user interface 200 presenting an example script creator screen is shown. The user interface 200 depicts a screen of the script creator 104 of FIG. 1 on which a user would draft a script. In various implementations, the user interface 200 may include on one side a script drafting area 204 and a function call area 208 on another side. For example, within the function call area 208 the user can select from known functions of the script creator, such as a graph function, a table function, an add column function, etc.

In the script drafting area 204, a text editing section 212 is defined by borders. Within the text editing section 212, the user can type or otherwise input lines of the script. Then, the user can select from a variety of options, which may be implemented as user-selectable buttons including: an update runtime estimate button 216, a compile script button 220, an execute script button 224, a function toolbar button 228 for adding/removing functions from the script, and a runtime accurate button 232, which provides feedback on whether the estimated runtime is accurate. The script drafting area 204 includes a portion (in this example, at the bottom) that describes an estimated runtime 236. As shown in FIG. 2A, the estimated runtime may be depicted as a category such as quick, medium, slow, etc. The estimated runtime may also be shown as a specific time or a color corresponding to a time (such as green for quick, yellow for medium, and red for slow). The user may selected the updating the runtime estimate button 216 to update the estimated runtime 236. The estimated runtime may also be automatically updated after each line of the script is written.

In various implementations, the script creator is a platform for users to access data stored by the entity and manipulate the data into a set of tables or graphs to visualize in a personalized manner. That is, the user can select the visualization format as well as what data the user would like to view. Additionally, in an example where the entity is a financial institution, the script creator may access financial instrument information including prices, history, etc., for the user to develop strategies by simulating orders.

The script creator functionalities can also include the ability to create watch lists, generate alerts, execute conditional orders, and search for items that meet personalized criteria. Due the potentially high volume of data being manipulated by the script creator, providing the estimated runtime 236 would improve user experience and reduce unknown wait times for generating tables, graphs, or simulations.

Figure 2B:
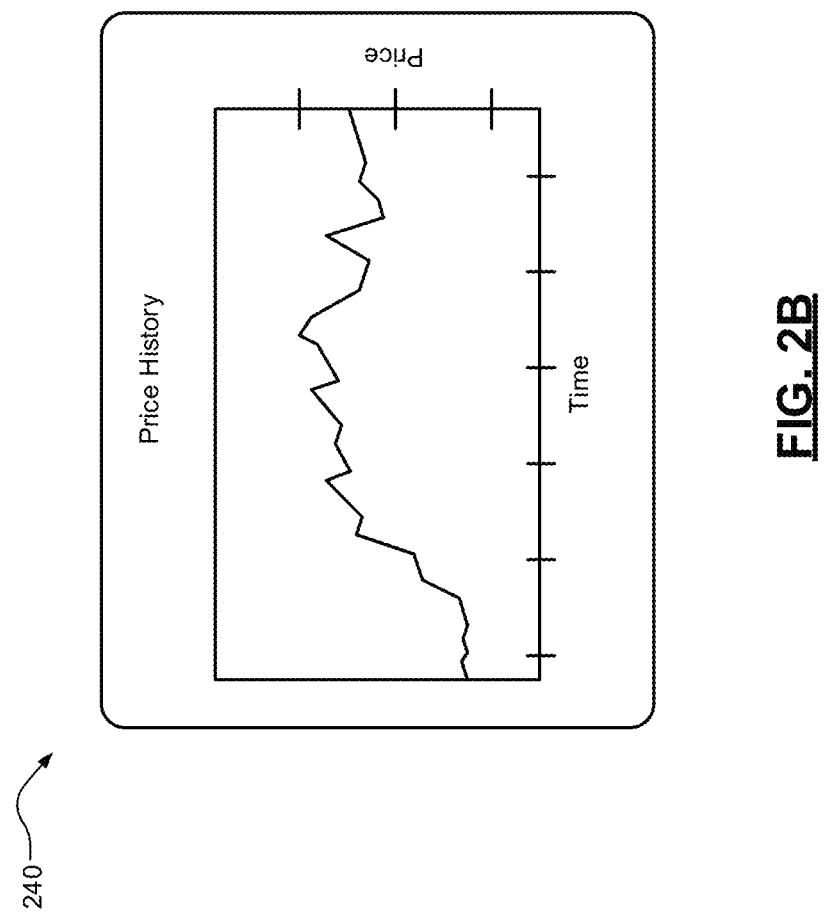
FIG. 2B is a representation of an example user interface presenting an example graph generated by a script drafted in a script creator according to the principles of the present disclosure.

FIG. 2B depicts an example price history graph 240 of a stock or combination of stocks that a user may aggregate in a script using the script creator to determine a general progression of a particular industry. As mentioned above, the stock information, in this example, may be accessible on a database for users to manipulate as desired, for example, to simulate trades or hypothesize a stock trend.

Figure 3:
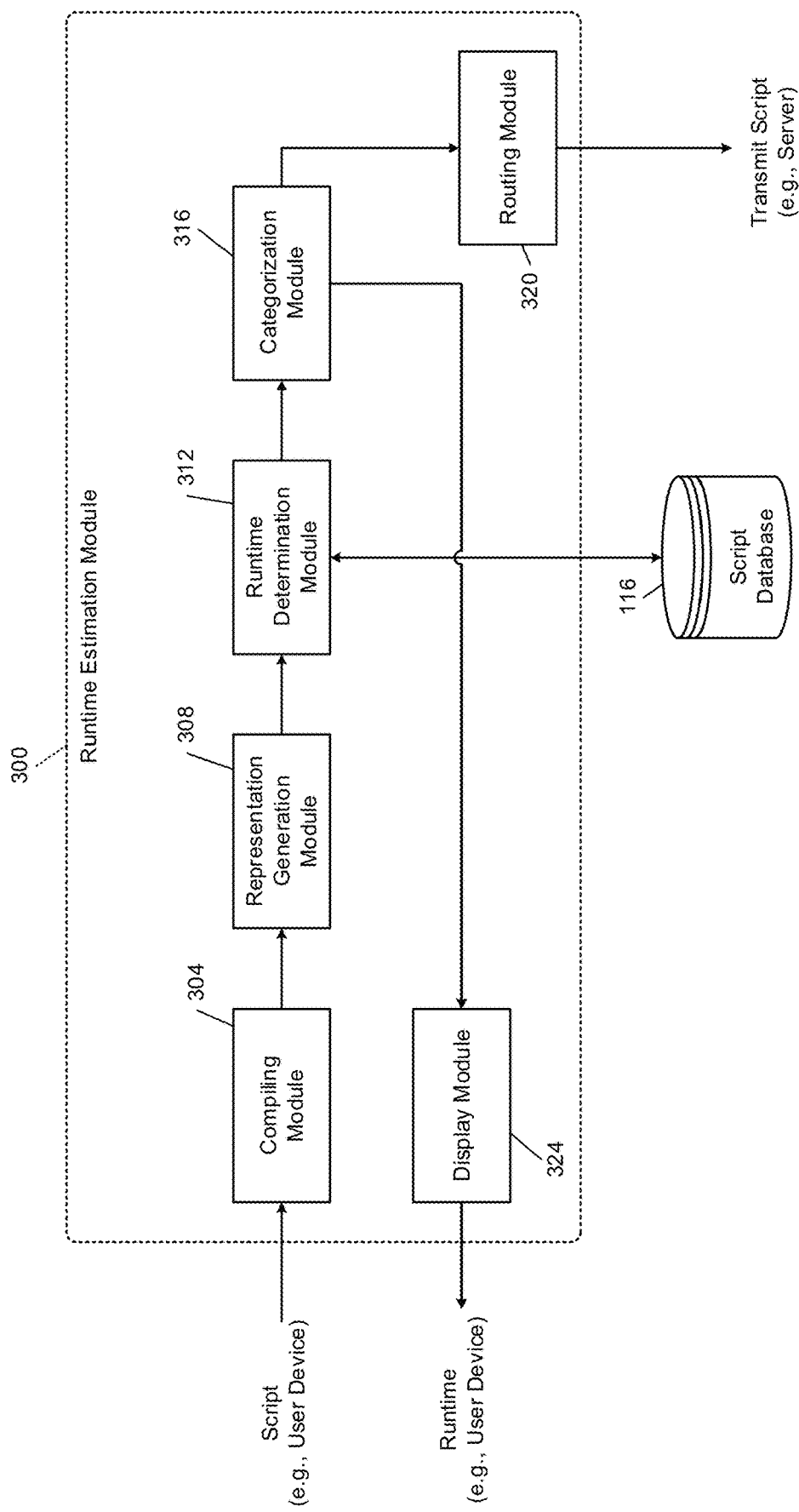
FIG. 3 is a functional block diagram of an example runtime estimation module for estimating a runtime using image representations according to the principles of the present disclosure.

Referring to FIG. 3, a functional block diagram of an example runtime estimation module 300 estimating a runtime using image representations is shown. The runtime estimation module 300 may be implemented as the runtime estimation module 124 shown in FIG. 1. The runtime estimation module 300 receives scripts from a user device via the Network. The runtime estimation module 300 includes a compiling module 304 that receives the script and compiles the script into bytecode.

The compiled bytecode is a computer instruction set including numeric values representing the human-readable script. A representation generation module 308 of the runtime estimation module 300 receives the bytecode and generates an image representation of the bytecode. The image representation is a converted form of the bytecode insofar as the image representation is an ordered array of the numeric values of the bytecode as pixels. Each pixel of the image representation is a greyscale shade that corresponds to the numeric value of the bytecode, ranging from 0 to 254.

The representation generation module 308 forwards the image representation to a runtime determination module 312. The runtime determination module 312 accesses the script database 116. The script database 116 includes training data used to train a machine learning algorithm. The runtime determination module 312 implements the trained machine learning algorithm to either (i) classify the script into a particular runtime category or (ii) calculate a script runtime. In various implementations, the script and the calculated script runtime are added to the script database 116 and the machine learning algorithm is intermittently updated with new script training data.

When classifying the script, a machine learning algorithm may be trained to define a set of groups based on the training dataset included in the script database 116 and classify the script into one of the groups. The runtime determination module 312 may use K-means clustering or a classification machine learning algorithm to classify the script into a group of the set of groups. As shown in FIG. 3, the machine learning algorithm can instead calculate the script runtime of the script and categorize the script using a categorization module 316.

The categorization module 316 is configured to determine which server should execute the script. For example, the categorization module 316 may receive the script runtime and select a first server if the script runtime is below a predetermined threshold and a second server if the script runtime is above or equal to the predetermined threshold. The predetermined threshold may be 2 seconds where every script that executes within 2 seconds is categorized and assigned to the first server and scripts with a 2 second execution time or longer are categorized and assigned to the second server. In various implementations, there may be three or more categories, each with a time range to which the scripts included in the category correspond.

Once categorized, the categorization is forwarded to a routing module 320. The routing module 320 forwards the script to the assigned server. In various implementations, the script may be added to a queue of the server. The categorization module 316 also forwards the categorization or the script runtime to a display module 324. The display module 324 is configured to display the estimated script runtime or an indication of the categorization. For example, if the script is categorized to the first server, based on the display settings, the user may be presented with the word "quick," indicating that the estimated script runtime is fast.

Figure 4:
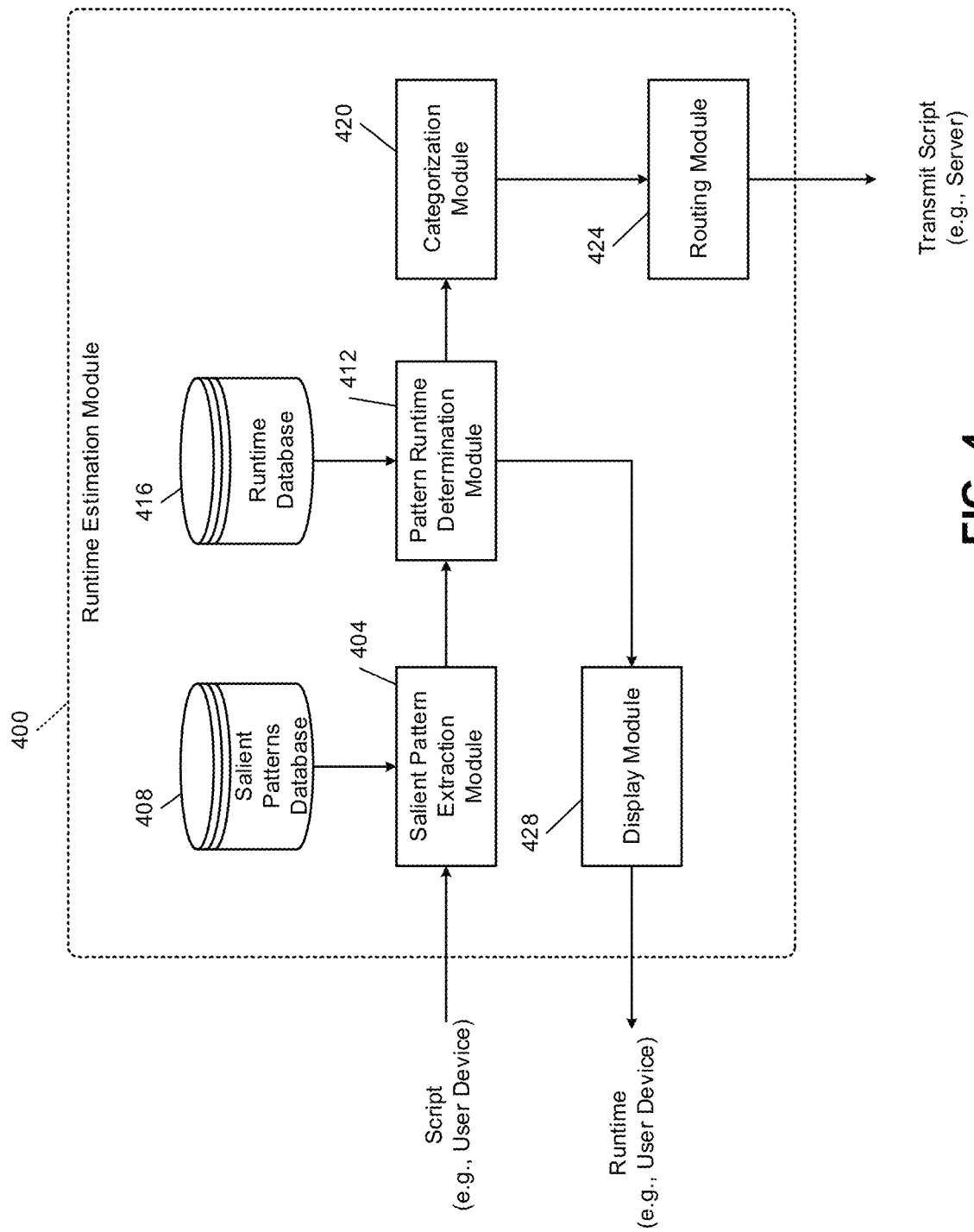
FIG. 4 is a functional block diagram of an example runtime estimation module for estimating a runtime using salient pattern processing according to the principles of the present disclosure.

Referring to FIG. 4, a functional block diagram of an example runtime estimation module 400 for estimating a runtime using salient pattern processing is shown. The runtime estimation module 400 may be implemented as the runtime estimation module 124 of FIG. 1. A salient pattern extraction module 404 of the runtime estimation module 400 receives a script from a user device. The salient pattern extraction module 404 identifies the salient patterns included in the script by accessing previously identified salient patterns stored in a salient patterns database 408.

Once the salient patterns are extracted from the script, the salient patterns are forwarded to a pattern runtime determination module 412. The pattern runtime determination module 412 accesses a runtime database 416. The runtime database 416 stores determined runtimes for salient patterns. The pattern runtime determination module 412 selects the determined runtimes for the salient patterns included in the script and aggregates the selected determined runtimes to estimate a runtime of the script.

The salient patterns included in the salient patterns database 408 and the runtimes included in the runtime database 416 are patterns and runtimes identified or calculated by a machine learning algorithm, which is trained using the training dataset including scripts with corresponding runtimes. The salient patterns may include words or terms, word vectors, numerical word representations, etc. The machine learning algorithm may involve natural language processing to identify salient patterns that influence script runtimes. In various implementations, the machine learning algorithms may be unsupervised to identify timing anomalies corresponding to particular salient patterns.

The pattern runtime determination module 412 estimates the script runtime. The script runtime is forwarded to a categorization module 420 which categorizes the script similar to the categorization module 316 of FIG. 3. Once assigned to a particular server, a routing module 424 forwards the script to the particular server. Additionally, the pattern runtime determination module 412 forwards the estimated runtime to a display module 428 for display on the user device. In various implementations, the categorization module 420 may forward the category for display on the user device using a corresponding color or word indicating a length of time the script will take to be executed.

Figure 5:
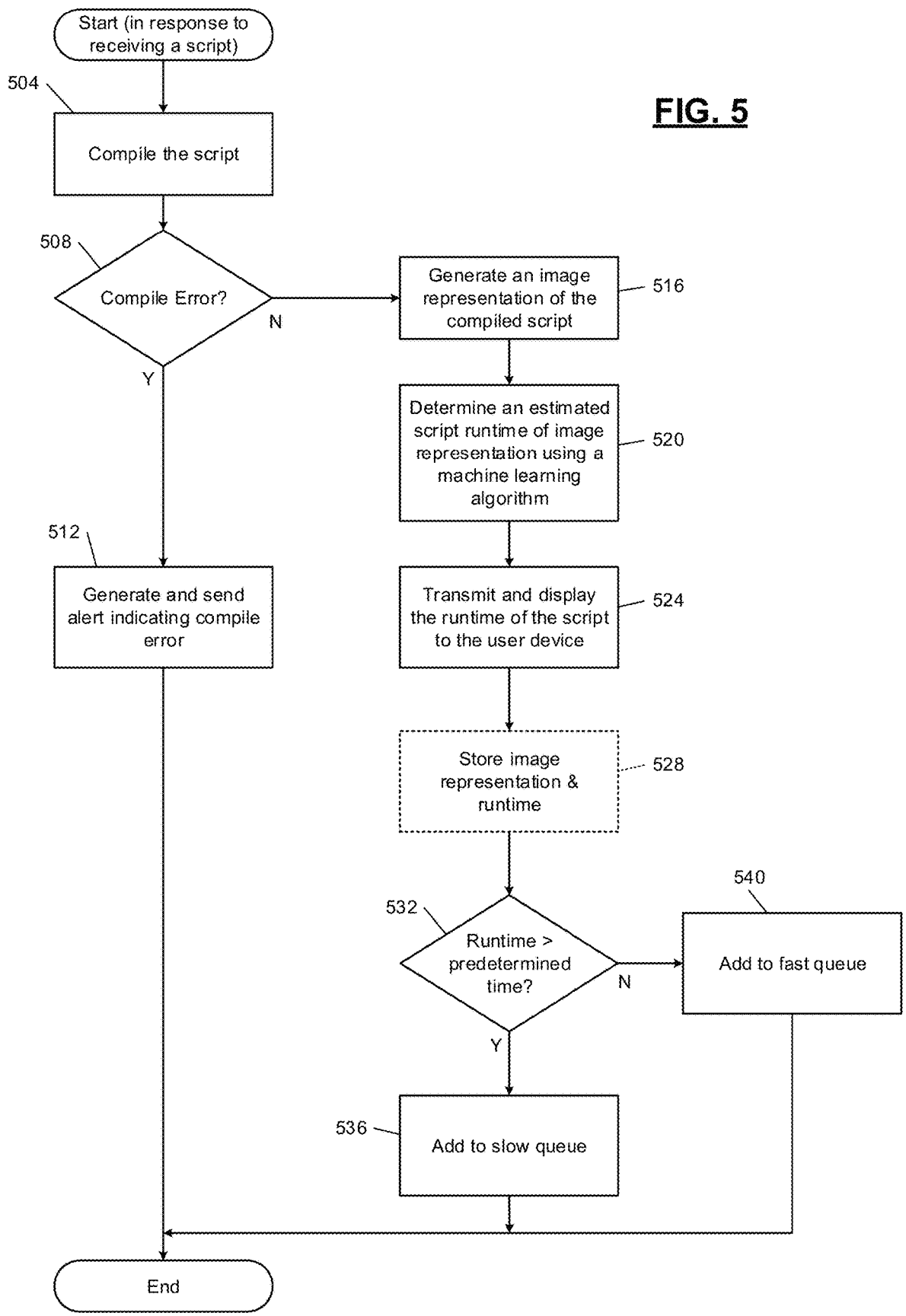
FIG. 5 is a flowchart depicting example determination of runtime estimation using image representations according to the principles of the present disclosure.

Referring to FIG. 5, a flowchart depicting example determining a runtime estimation using image representations is shown. Control beings in response to receiving a script. The script may be transmitted by a user selecting a button, such as an execute button or an estimate runtime button. Once the script is received, control continues to 504 to compile the script. For example, control compiles the script into bytecode, a numeric computer-representation of the script. Then, control determines if a compile error has occurred at 508. If yes, control proceeds to 512 to generate and send an alert indicating a compile error. Then, control ends. Otherwise, if no compile error has occurred at 508, control continues to 516 to generate an image representation of the compiled script.

Then, at 520, control determines an estimated script runtime based on the image representation or classify the image representation using a machine learning algorithm. The machine learning algorithm is trained using previously analyzed images. The training dataset of previously analyzed images includes known runtimes of the scripts corresponding to the images to train the machine learning algorithm to determine the estimated runtime.

Control continues to 524 to transmit and display the estimated script runtime to the user device. Control proceeds to 528 to optionally store the image representation and corresponding estimated runtime. In this way, the machine learning algorithm can be updated using an updated dataset. In various implementations, the user can provide feedback through the screen of the user device to indicate whether the estimated script runtime was accurate. If the user feedback indicates that the estimated script runtime was accurate, control stores the image representation and estimated runtime. Otherwise, control excludes or removes the image representation and runtime from being included in training the machine learning algorithm.

Then, control continues to 536 to determine if the estimated script runtime is greater than a predetermined time. If yes, the script is added to a slow queue at 536, meaning that the script is assigned to a server designated to execute scripts with a longer runtime. Otherwise, if the runtime is less than or equal to the predetermined time, control proceeds to 540 and the script is added to a fast queue. In various implementations, a plurality of queues distinguished based on speed, length, or other various factors may be implemented, allowing for N number of queues. At 540, the script is assigned to a different server designated to execute scripts with a shorter runtime. Then, control ends.

Figure 6:
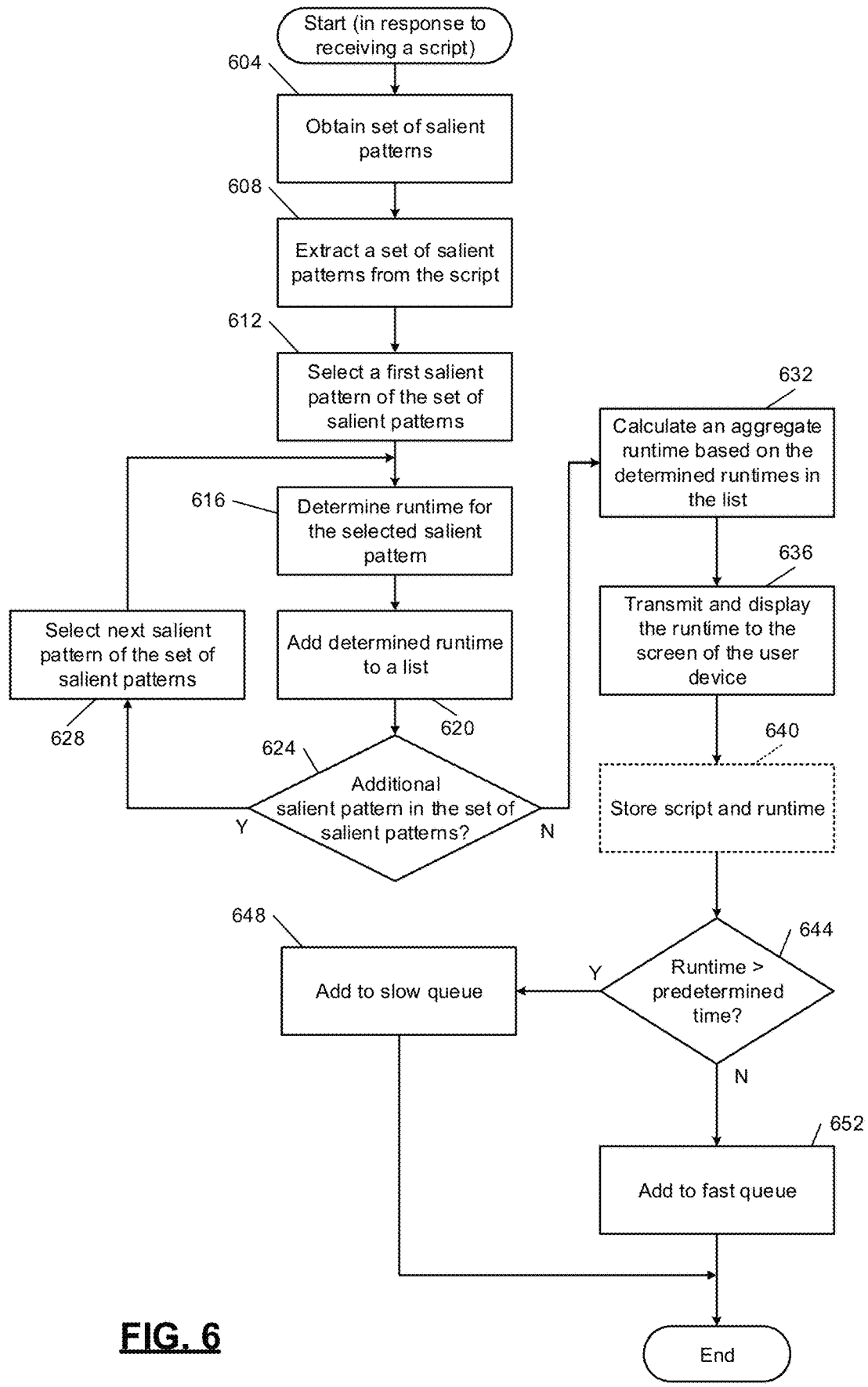
FIG. 6 is a flowchart depicting example determining a runtime estimation using salient pattern processing according to the principles of the present disclosure.

Referring to FIG. 6, a flowchart depicting example determining a runtime estimation using salient pattern processing is shown. Control beings in response to receiving a script. Control continues to 604 to obtain a set of salient patterns. In various implementations, the set of salient patterns is identified by a machine learning algorithm that determines salient patterns within a large training dataset of scripts. Control proceeds to 608 to extract a set of salient patterns from the script.

Control continues to 612 to select a first salient pattern of the set of extracted salient patterns. At 616, control determines a runtime for the selected salient pattern. The runtime corresponding to the selected salient patterns may also be identified by a machine learning algorithm that determines corresponding runtimes for each of the previously identified salient patterns. The runtime can be determined since the runtime for each script in the training dataset is known.

Control continues to 620 to add the determined runtime to a list. Once added, control proceeds to 624 to determine if additional salient patterns are in the set of salient patterns. If yes, control selects the next salient pattern of the set of salient patterns and returns to 616. Otherwise, control continues to 632 to calculate an aggregate runtime of the determine runtimes in the list. In various implementations, the aggregate runtime may be adjusted based on an amount of data being selected or manipulated in the script.

Then, control proceeds to 636 to transmit and display the runtime to the screen of the user device. Optionally, control stores the script and runtime at 640 for incorporation into the previously discussed machine learning algorithms. In various implementations, the script and runtime are only stored and included in the machine learning algorithms if user feedback is received indicating the runtime was accurate.

Then, control continues to 644 to determine if the runtime is greater than a predetermined time. If yes, control continues to 648 to add the script to the slow queue for execution by a server designated to execute scripts with a longer runtime. Otherwise, control continues to 652 to add the script to the fast queue for execution by a different server designated to execute scripts with a shorter runtime. As mentioned previously, control may select which queue to add the script to from N number of queues.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer system for coordinated control of a plurality of servers the computer system comprising:
    a processor hardware; and
    a memory hardware coupled to the processor hardware, wherein the memory hardware stores,
        a script runtime database including a set of image representations of scripts and corresponding script runtimes, and instructions that when executed by the processor hardware cause the computer system to perform in response to receiving a first script from a user device,
    compiling the first script into a bytecode representation;
    generating an image representation of the bytecode representation by converting each bytecode of the bytecode representation into a pixel with a greyscale shade that corresponds to a numeric value of the bytecode;
    determining an estimated runtime of the first script based on the image representation of the bytecode representation using a machine learning algorithm, the machine learning algorithm being trained using the set of image representations and corresponding script runtimes of the script runtime database;
    outputting the estimated runtime on a display of the user device;
    categorizing the estimated runtime;
    transmitting the first script to a queue of a server of a plurality of servers based on the categorization;
    in response to the first script reaching a front of the queue, executing the first script on the server of the plurality of servers that corresponds to the queue; and
    in response to the first script being executed, outputting a result of the execution of the first script on the display of the user device.

2. The computer system of claim 1 wherein an intensity of each pixel of the image representation indicates the numeric value of each bytecode of the bytecode representation ranging from 0 to 254.

3. The computer system of claim 1 wherein the instructions include, in response to receiving an indication that the estimated runtime is accurate, storing the estimated runtime and the image representation in the script runtime database.

4. The computer system of claim 1 wherein the first script is received from the user device in response to selection of a user interface element.

5. The computer system of claim 1 wherein the first script is received from the user device in response to selection of a new line of the first script.

6. The computer system of claim 1 wherein:
    the memory hardware stores an information database including data referenced in the first script and
    the first script includes an instruction to obtain data from the information database.

7. The computer system of claim 1 wherein the instructions include, in response to receiving an indication that the compiling of the first script failed, generating and transmitting a compile error to the user device.

8. The computer system of claim 1 wherein the instructions include:
    categorizing the first script as a first type in response to the estimated runtime being less than a predetermined time and
    in response to the first script being categorized as the first type, transmitting the first script to a first queue of a first server of the plurality of servers.

9. The computer system of claim 1 wherein the instructions include:
    categorizing the first script as a second type in response to the estimated runtime being greater than a predetermined time and
    in response to the first script being categorized as the second type, transmitting the first script to a second queue of a second server of the plurality of servers.

10. A processing system comprising:
    the computer system of claim 1 and
    the plurality of servers, the computer system and the plurality of servers being communicatively coupled through a network.

11. A method for coordinated control of a plurality of servers, the method comprising:
    in response to receiving a first script from a user device:
        compiling the first script into a bytecode representation;
        generating an image representation of the bytecode representation by converting each bytecode of the bytecode representation into a pixel with a greyscale shade that corresponds to a numeric value of the bytecode;
        determining an estimated runtime of the first script based on the image representation of the bytecode representation using a machine learning algorithm, the machine learning algorithm being trained using the set of image representations of scripts and corresponding script runtimes of a script runtime database, and wherein the script runtime database includes the set of image representations and corresponding script runtimes;
outputting the estimated runtime on a display of the user device;
categorizing the estimated runtime;
transmitting the first script to a queue of a server of a plurality of servers based on the categorization;
in response to the first script reaching a front of the queue, executing the first script on the server of the plurality of servers that corresponds to the queue; and
in response to the first script being executed, outputting a result of the execution of the first script on the display of the user device.

12. The method of claim 11 wherein an intensity of each pixel of the image representation indicates the numeric value of each bytecode of the bytecode representation ranging from 0 to 254.

13. The method of claim 11 further comprising, in response to receiving an indication that the estimated runtime is accurate, storing the estimated runtime and the image representation in the script runtime database.

14. The method of claim 11 wherein the first script is received from the user device in response to selection of: (i) a user interface element or (ii) a new line of the first script.

15. The method of claim 11 further comprising:
storing an information database including data referenced in the first script, wherein the first script includes an instruction to obtain data from the information database.

16. The method of claim 11 further comprising:
in response to receiving an indication that the compiling of the first script failed, generating and transmitting a compile error to the user device.

17. The method of claim 11 further comprising:
categorizing the first script as a first type in response to the estimated runtime being less than a predetermined time; and
in response to the first script being categorized as the first type, transmitting the first script to a first queue of a first server of the plurality of servers.

18. The method of claim 11 further comprising:
categorizing the first script as a second type in response to the estimated runtime being greater than a predetermined time; and
in response to the first script being categorized as the second type, transmitting the first script to a second queue of a second server of the plurality of servers.

* * * * *